US006206943B1

(12) United States Patent
Friesen et al.

(10) Patent No.: US 6,206,943 B1
(45) Date of Patent: Mar. 27, 2001

(54) SEPARATOR SYSTEM FOR AIRCRAFT WASTE SYSTEM

(75) Inventors: Jeff Friesen, Sandy; Chris Lalor, Salt Lake City; Mark Hale, Draper, all of UT (US); Heidi Crist, Danbury, TX (US); Benko S. Ta'ala, Salem, UT (US)

(73) Assignee: EDO Fiber Science, Salt Lake City, UT (US)

( * ) Notice: Subject to any disclaimer, the term of this patent is extended or adjusted under 35 U.S.C. 154(b) by 0 days.

(21) Appl. No.: 09/358,942

(22) Filed: Jul. 22, 1999

Related U.S. Application Data

(63) Continuation-in-part of application No. 08/926,754, filed on Sep. 10, 1997, now abandoned.

(51) Int. Cl.⁷ .......................... B01D 29/56; B01D 35/027
(52) U.S. Cl. ..................... 55/320; 55/385.4; 55/467; 55/487; 55/505; 96/189; 96/190
(58) Field of Search ................................. 55/385.4, 487, 55/505, 467, 315, 318, 320; 96/188, 189, 190; 4/316, 432

(56) References Cited

U.S. PATENT DOCUMENTS

| | | |
|---|---|---|
| 2,970,671 | 2/1961 | Warner . |
| 3,269,097 | 8/1966 | German . |
| 4,385,912 | 5/1983 | Parrick et al. . |
| 5,026,407 | 6/1991 | Tobey . |
| 5,234,483 | 8/1993 | Tertre et al. . |
| 5,538,546 * | 7/1996 | Ashton et al. ........................ 96/195 |

* cited by examiner

Primary Examiner—David A. Simmons
Assistant Examiner—Robert A. Hopkins
(74) Attorney, Agent, or Firm—Thorpe, North & Western, LLP

(57) ABSTRACT

An aircraft separator system for removing moisture suspended in a gas of an aircraft waste system includes a waste tank and a vacuum source operatively coupled to the waste tank for creating a vacuum for drawing the waste material into the tank and drawing the gas with the moisture suspended therein out of the tank. A disposable separator housing for removing moisture suspended in the gas is disposed on the tank and removably coupled between the waste tank and the vacuum source such that the entire separator housing may be detached from the waste tank and vacuum source and discarded. A two-stage filter is contained within an interior of the housing without extending into the waste tank. The filter has at least two areas of different density mesh defining two stages including a first area located proximal to a separator inlet opening which is less dense, and a second area located proximal to a separator outlet opening which is more dense. A shroud is disposed in the waste tank at the gas outlet of the tank to minimize passage of the solids and liquids out of the gas outlet. The shroud has an annular wall with a plurality of apertures through which the gas passes in exiting the tank, and a shield attached to a lower end of the annular wall.

22 Claims, 4 Drawing Sheets

SEPARATOR SYSTEM FOR AIRCRAFT WASTE SYSTEM

This application is a continuation-in-part of application Ser. No. 08/926,754, filed Sep. 10, 1997, now abandoned.

BACKGROUND OF THE INVENTION

1. Field of the Invention

The present invention relates to an aircraft separator system for separating moisture from air in an aircraft waste system. More particularly, the present invention relates to a disposable separator sized large enough to decrease air velocity and optimize moisture separation from the air, but small enough to fit within limited aircraft space, located externally to a waste tank to reduce exposure to waste and facilitate service, with a dual-stage, dual-density filter/demister to separate the moisture from the gas, and with a deflector shield to minimize passage of solids and liquids into the separator.

2. Prior Art

The waste system of an aircraft uses a pressure differential, or vacuum, to move waste from toilets to a waste tank. The air, waste, and water move from the toilets to the waste tail where the air is passed from the waste tank and vented to the atmosphere. The vacuum is typically created by a blower when the aircraft is on the ground or at low altitudes. At higher altitudes, the vacuum is created by venting the system to the lower pressure atmosphere. It is necessary for the air to be free of moisture and other particles for sanitary and aesthetic reasons, and to satisfy Federal Aviation Administration (FAA). For example, the moisture, called blue ice, may build up on the fuselage, which affects aircraft performance and may fall off causing injury. Two key performance requirements require (1) a specific air flow rate at a maximum pressure drop, and (2) a "flush and overboard" test where the toilets are first repeatedly flushed at close intervals to fill the waste tank, drawn outside the system.

Conventional liquid/air separators have been used to filter moisture and particles out of the air before venting the air to the atmosphere, or before the air reaches the blower. The separators impart a rotational motion to the air and make use of centrifugal force to separate the heavier fluid from the air. The separators also use a demister, a dense, knitted mesh of metal, nylon, or polypropylene, to trap any remaining moisture.

One disadvantage with these separators is that they are often located, at least partially, within the waste tanks themselves. The location of the separators within the tanks robs the tanks of needed capacity for storing waste. In addition, because of the need to frequently clean the separators and replace the demister material, their location within the tank makes the separators difficult to service. Furthermore, the location of the separators within the waste tank leaves some unfortunate maintenance worker the unpleasant job of reaching into the waste tank and handling the demister material. The cost to replace the demister material is high because workers must frequently suit-up in hazardous material suits, and because workers must often be paid hazard pay to perform such a task.

Another disadvantage of some general separators is their large size. Many separators utilize vanes and cylindrical enclosures to impart a rotational flow to the air in order to force moisture from the air. Other separators utilize a tortuous path with numerous turns to prevent particulate from entering the demister material. The structure used to accomplish the rotational flow and tortuous path tends to require additional space. The space available for equipment on the aircraft, however, is limited. Thus, it is desirable for the separators to be as small as possible to preserve valuable space. In addition, the structure of the aircraft itself may force size requirements on the separator. Furthermore, larger separators tend to require larger openings in the waste tank, thus increasing the risk of foreign objects, such as tools, inadvertently falling into the waste tank during replacement or maintenance. In addition, larger tank openings cause unnecessary exposure to the tank contents. Therefore, many separators are unsuitable due to their large size.

Another disadvantage related to size is airflow. As indicated above, performance requirments require a certain air mass and pressure drop. While it is desirable to reduce the size of the separator, maintaining the required mass flow rate as the size of the separator shrinks tends to increase the velocity of the air flow, thus making moisture separation more difficult.

Therefore, it would be advantageous to develop an aircraft separator system capable of separating the moisture from the air, and capable of meeting FAA approval and performance requirements. It also would be advantageous to develop an aircraft separator system capable of being easily and safely maintained and replaced, reducing exposure to waste, and maintaining the capacity of the waste tank. It also would be advantageous to develop an aircraft separator system capable of being installed in the limited spacial requirements of an aircraft, without compromising performance.

OBJECTS AND SUMMARY OF THE INVENTION

It is an object of the present invention to provide an aircraft separator system for separating moisture from air, and which meets FAA approval and performance requirements It is another object of the present invention to provide an aircraft separator system which is easily maintainable, and reduces exposure to waste, and maintains tank capacity.

It is another object of the present invention to provide an aircraft separator system which can be installed in an aircraft, without compromising performance.

These and other objects and advantages of the present invention are realized in an aircraft separator system for removing moisture suspended in a gas of an aircraft waste system. The separator system includes a waste tank for receiving and holding waste material including solids and liquids. The waste tank has a waste inlet opening through which the waste material enters the tank and a gas outlet through which the gas with the moisture suspended therein exits the tank. A vacuum source is coupled to the waste tank for creating a vacuum for drawing the waste material into the tank and drawing the gas with the moisture suspended therein out of the tank.

The separator system also includes a separator apparatus disposed on the waste tank and coupled between the waste tank and the vacuum source. The separator apparatus advantageously has a disposable separator housing disposed directly on the waste tank, and removably coupled between the waste tank and vacuum source. Thus, the entire housing advantageously may be removed and discarded without exposure to the waste in the tank or the separator. The housing has a housing wall defining a hollow interior, a separator inlet opening, and a separator outlet opening. The separator inlet and outlet openings defining a gas flow path extending between the separator inlet and outlet openings.

Advantageously, the inlet opening has a diameter of approximately 5 inches and the housing has a diameter of approximately 7 inches. Thus, the opening is sized large enough to minimize the gas velocity such that moisture may be removed, and the housing is sized small enough to fit within the space limitations of an aircraft.

A filter is completely contained within the interior of the housing and disposed in the gas flow path without extending out of the separator inlet opening and into the waste tank. Again, the housing may be discarded without exposure to waste trapped by the filter. Preferably, the filter is a two-stage filter having at least two areas of different density mesh defining two stages. A first area is located proximal to the separator inlet opening and is less dense for separating larger particles from the air. A second area is located proximal to the separator outlet opening and is more dense.

Preferably, a shroud advantageously is disposed in the waste tank at the gas outlet of the tank to minimize passage of the solids and liquids out of the gas outlet. The shroud has an annular wall with an upper end disposed at the tank and extending downwardly to a lower end spaced from the gas outlet. A plurality of apertures are formed in the annular wall through which the gas passes in exiting the tank. The shroud further has a shield attached to the lower end of the annular wall and disposed in front of the gas outlet.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
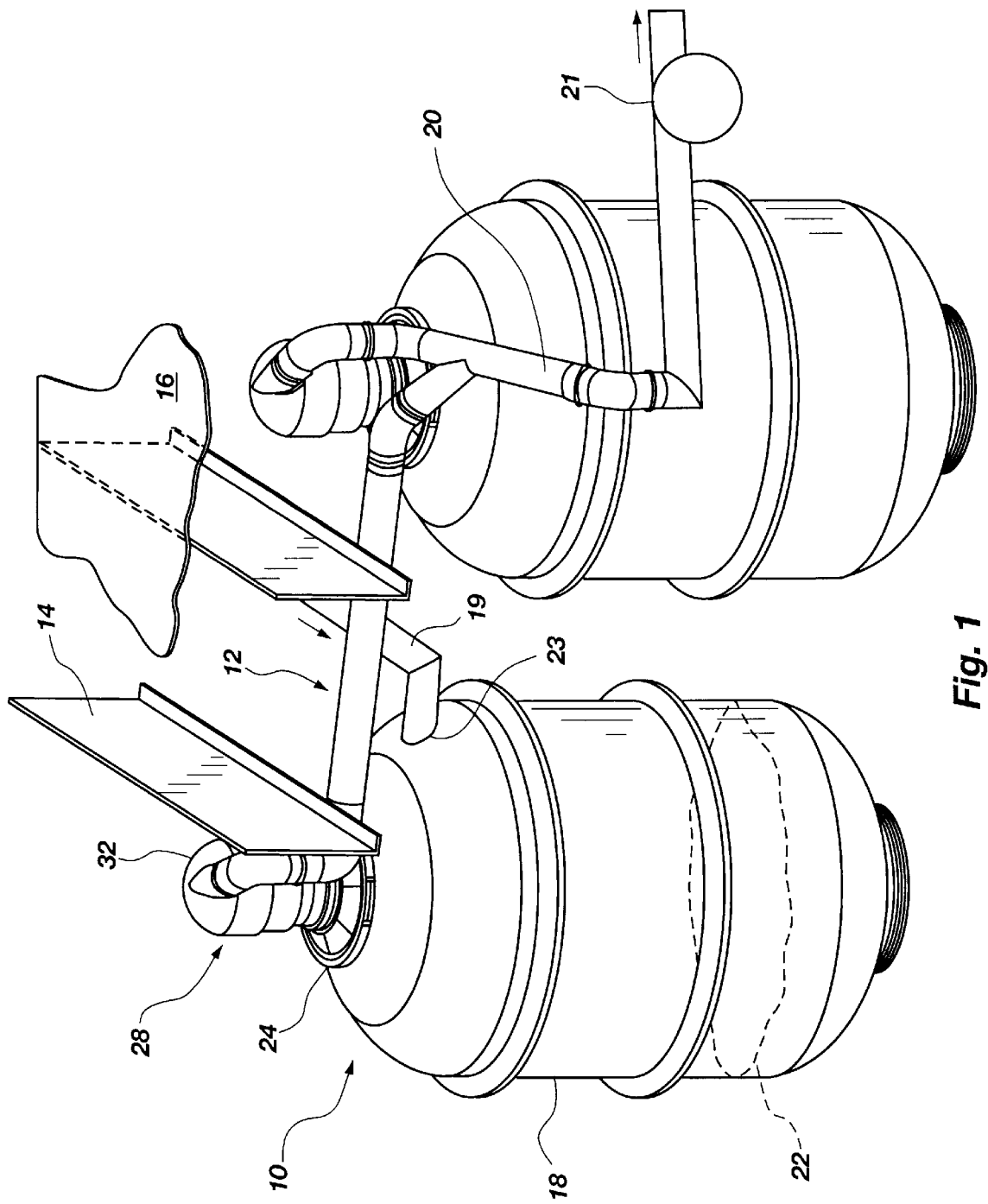
FIG. 1 is a perspective view of a preferred embodiment of an aircraft separator system of the present invention with a portion of an aircraft structure.

As illustrated in FIG. 1, an aircraft separator system, indicated generally at 10, of the present invention is shown with an aircraft waste system, indicated generally at 12, and aircraft structural components 14. A majority of the waste system 12 is typically located under the floor components 16 in the fuselage of the aircraft. The waste system 12 includes toilets (not shown); waste tanks 18;

pipes 19 connecting the toilets to waste tanks 18; and pipes 20 connecting the waste tanks 18 with a vacuum source (illustrated schematically at 21). The vacuum source 21 may be a blower at lower altitudes, or a vent to ambient air at higher altitudes.

Waste material 22 is drawn from the toilets, through the pipes 19, and into the waste tanks 18 by the vacuum source 21 through a waste tank inlet opening 23. In addition, air, or gas, is also drawn through the pipes and tanks. The waste material 22 includes solids and liquids. As the waste material 22 and air are drawn through the pipes and other components of the system, the air accumulates moisture from the liquid waste. Thus, the waste material 22 includes the moisture which becomes suspended in the air.

The waste material 22 settles in the waste tanks 18 while the air continues to be drawn out of the waste tanks 18 through gas outlet openings 24, and out of the waste system 12 and the aircraft by the vacuum source 21. A majority of the waste materials 22, such as the solids and liquids, settle in the tanks 18 due to their heavier weight. Moisture and other small particles of solids and liquid, however, are carried out of the waste tanks 18 by the air. The moisture and smaller particles do not settle in the tank due to their lighter weight, and the force of the air flow.

At lower altitudes or while on the ground, this moisture and smaller particles have the potential to reach the blower. At higher altitudes, the moisture has the potential to form on the fuselage as blue ice. The build up of waste moisture on the aircraft is unacceptable due to sanitary, aesthetic, and safety reasons.

The separator system 10 of the present invention includes a separator apparatus, indicated generally at 28, coupled between the waste tanks 18 and the vacuum source 21 such that the flow of air passes through the separator apparatus 28. The separator apparatus 28 advantageously is located completely outside of the waste tank 18. By disposing the separator apparatus 28 externally of the waste tank 18, the capacity of the waste tank is not limited and the separator apparatus 28 may be serviced without exposing the waste material 22 contained in the waste tank 18.

In addition, the separator apparatus 28 preferably and advantageously is located directly on, or attached directly to the waste tanks 18. Thus, the separator apparatus 28 is assessable through present access means in the aircraft structure. In addition, the separator apparatus 28 may be located in present areas in the aircraft designated for access to the waste tanks 18. Furthermore, by locating separator apparatus 28 immediately above tank 18, removed moisture may be directly returned to the waste tanks 18 under the force of gravity, without the need for return lines.

Figure 2:
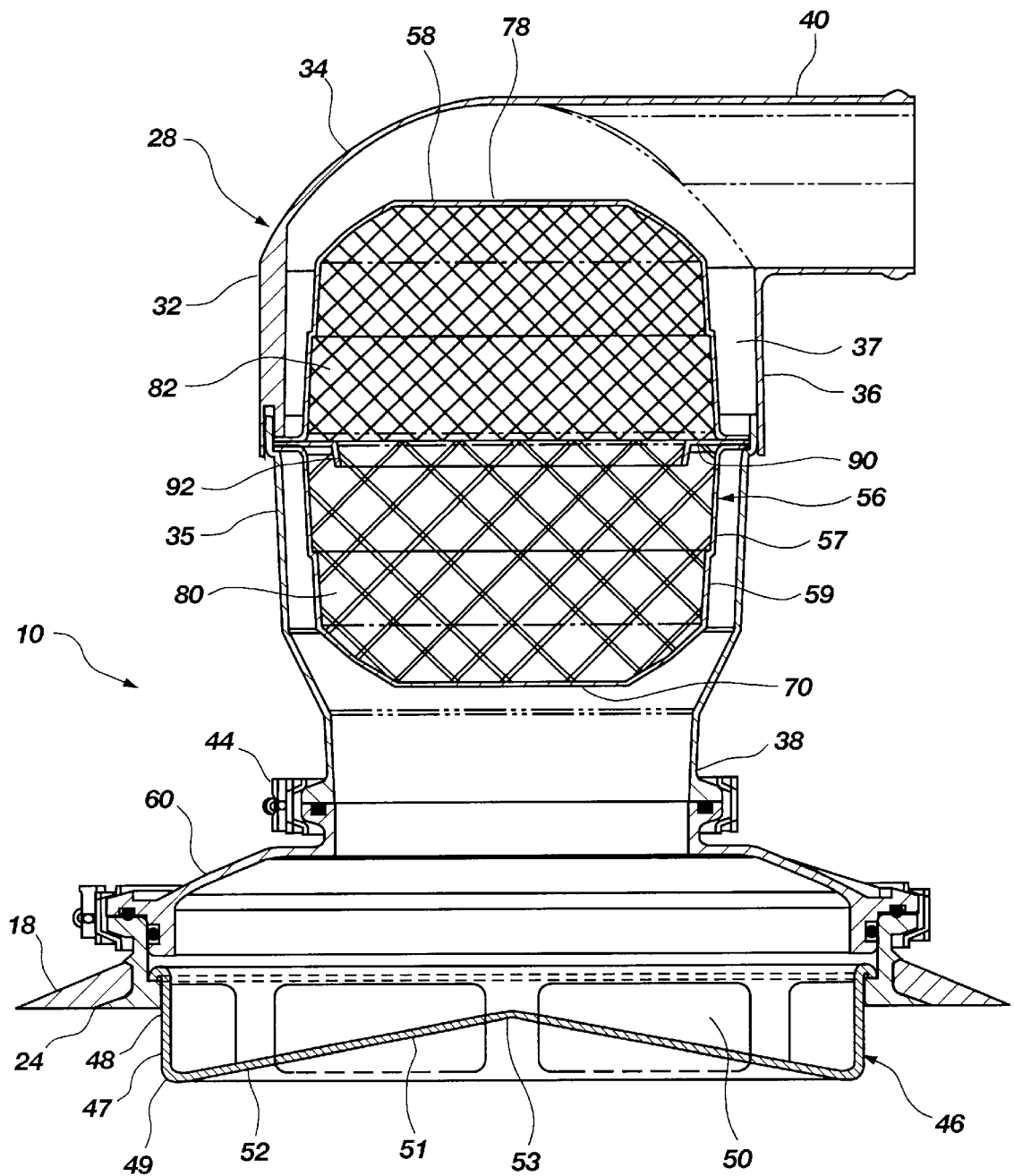
FIG. 2 is a partial cross-sectional side view of a preferred embodiment of a separator apparatus of the present invention.

Referring to FIG. 2, the separator apparatus 28 has an enclosed separator housing 32 which is preferably and advantageously disposable, as discussed more fully below. The housing 32 has a first upper portion 34 permanently attached to a second lower portion 35. The housing 32 has a housing wall 36 defining a hollow interior or space 37. A separator inlet opening 38 is coupled to the gas outlet 24 of the waste tank 18 so that the inlet opening 38 is in fluid communication with the waste tank 18. The gas with moisture suspended therein is drawn into the housing 32 through the inlet opening 38 by the vacuum source 21. In addition, moisture drains out of the housing 32 through the inlet opening 38 and into the waste tank 18. A separator outlet opening 40 is coupled to the vacuum source 21, or the piping 20 leading to the vacuum source 21, so that the outlet opening 40 is in fluid communication with the vacuum source 21. The gas is drawn out of the housing 32 through the outlet opening 40.

As indicated above, the separator housing 32 preferably and advantageously is disposable.

The separator inlet opening 38 preferably is removably or detachably coupled to the gas outlet 23, and the separator outlet opening 40 is removably or detachably coupled to the vacuum source 21, or the pipes 20 leading to the vacuum source 21. Thus, the entire separator housing 32 may be detached from the waste tank 18 and the vacuum source 21 and discarded or disposed.

Referring again to FIG. 2, the housing 32 is disposed on the waste tank 18. The inlet opening 38 of the housing 32 is in fluid communication with the gas outlet 24 of the waste tank 18 such that gas with moisture suspended therein may be drawn into the housing 32 and moisture may drain out of the housing 32 and into the waste tank 18. The housing 32 may be attached to the waste tank 18 by securing the inlet opening 38 of the housing 32 to a polar cap 60 with a clamp 44. The polar cap 60 covers the gas outlet 23 and forms a portion of the waste tank 18.

The separator inlet and outlet openings 38 and 40 define a gas flow path extending therebetween. Preferably, the gas flow path is substantially linear or straight, and is unimpeded by another structure other than the filter, as described more fully before. Thus, the separator apparatus 28 of the present invention avoids the use of a tortuous path or rotational flow utilized by some prior art air separators. Thus, the size of the housing 32 and separator apparatus 28 are reduced to fit within the limited space, and optimize the flow as discussed more fully below. Preferably, the housing 32 has a diameter of less than approximately 7 inches.

Advantageously, a shroud 46 preferably is disposed in front of and spaced-apart from the gas outlet 24 of the waste tank 18 to shield the gas outlet 24 and the separator inlet opening 38, thus preventing passage of solid and liquid waste material 22 from the waste tank 18. The shroud 46 preferably is disposed within the waste tank 18 and has an annular wall 47 extending from an upper end 48 downwardly at the waste tank 18 near the gas outlet 24 to a lower end 49. A plurality of apertures or slots 50 are formed in the annular wall 47 of the shroud 46 to permit air to pass therethrough and out the gas outlet 24. The shroud 46 also preferably has a shield 51 attached to the annular wall 47 and located in front of the gas outlet 24. Thus, the shield 51 prevents solid and liquid waste material 22 from directly exiting the tank 18, while air passes around the shield 51 and through the apertures 50. The shield 51 preferably is concave or conical with a lower end 52 attached to the lower end 49 of the annular wall 47 and extending upwardly to an upper end 53. Thus, the shield 51 has an angled upper surface so that moisture removed from the air in the housing 32 is directed along the upper surface to the apertures 50 and into the tank 18.

The gas outlet 24 of the waste tank 18 and the shroud 46 are similarly sized so that the shroud 46 may be located within the tank 18 through the gas outlet 24. The polar cap 60 closes off the gas outlet 24 and supports the shroud 46.

Figure 3:
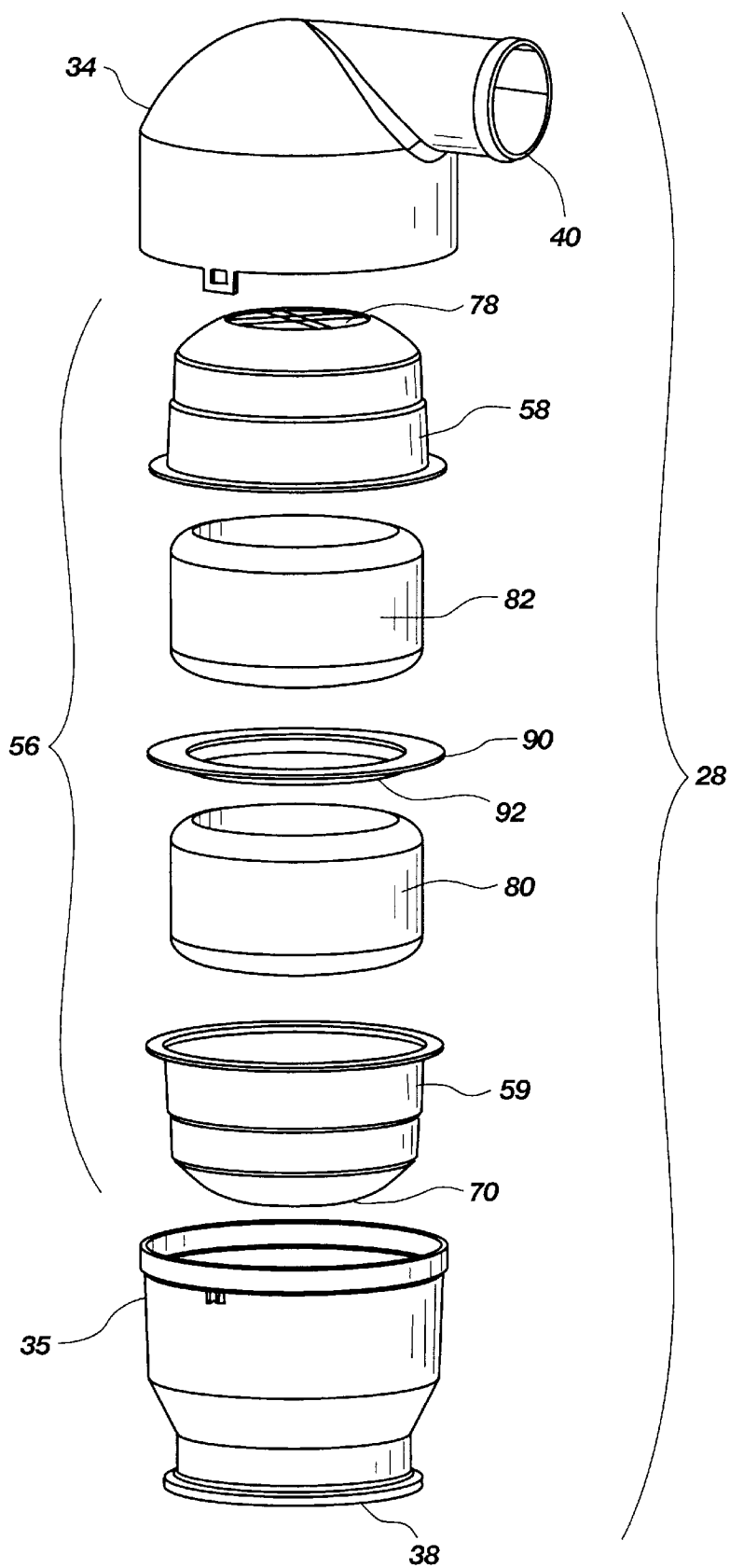
FIG. 3 is an exploded perspective view of a preferred embodiment of the separator apparatus of the present invention.
Figure 4:
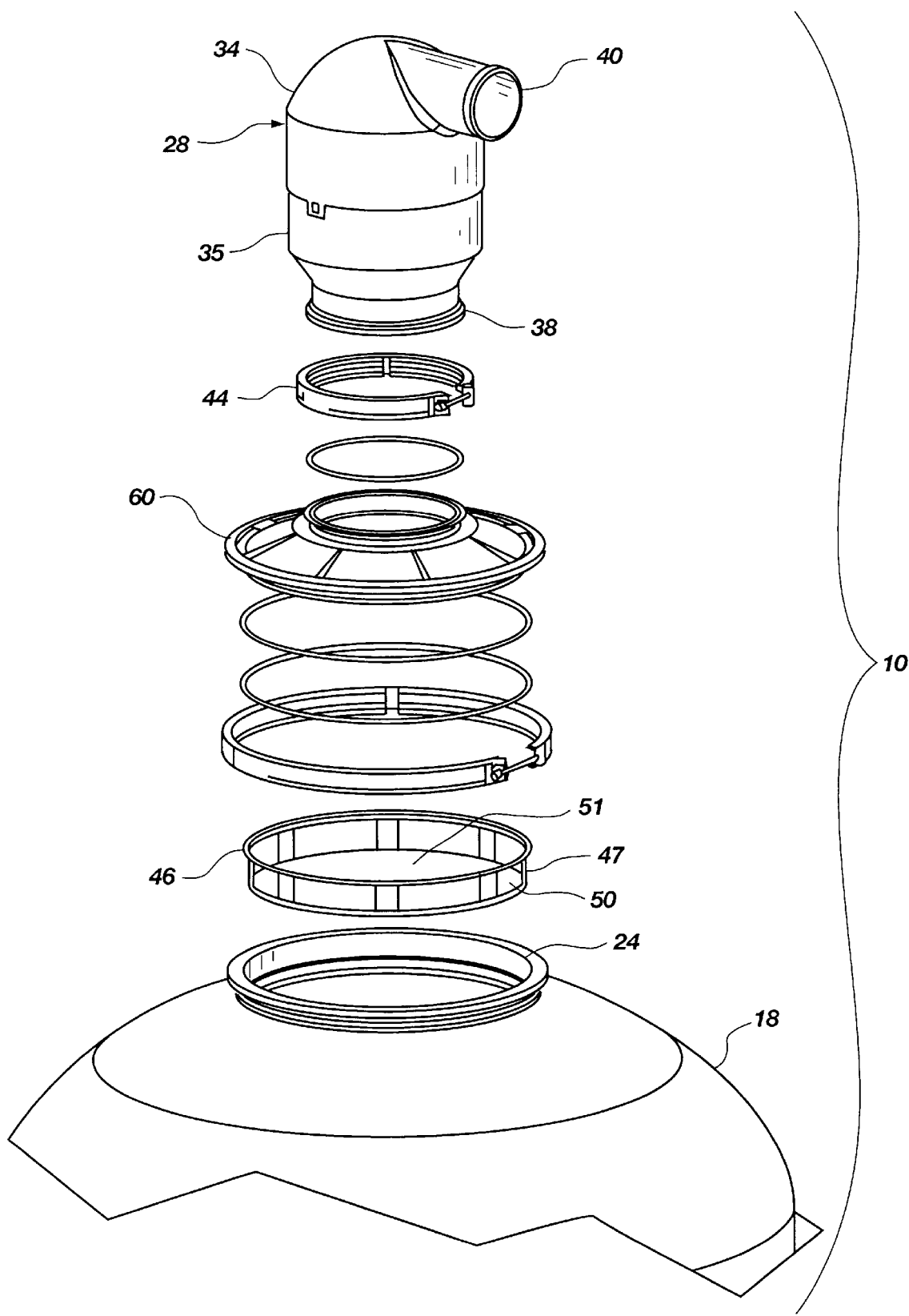
FIG. 4 is a partial exploded perspective view of a preferred embodiment of the separator system of the present invention.

Referring to FIGS. 2 and 3, a filter, indicated generally at 56, disposed in the housing 32, or interior 37, and in the gas flow path defined by the separator inlet and outlet openings 38 and 40. The filter may be disposed in a filter cannister 57, as shown. The cannister 57 has an upper portion 58 and a lower portion 59 defining upper and lower areas, respectively, of the filter 56. The upper and lower portions 58 and 59 of the cannister 57 define an interior space. The cannister 57 has an inlet opening 70 for permitting the gas and suspended moisture to enter the cannister 57. The cannister 57 also has an outlet opening 78.

A filter or demister material is disposed within the cannister 57. The filter 56 advantageously is a two-stage filter with first and second different areas 80 and 82 of different density mesh. The first area 80 of the filter 56 or filter material is disposed proximal to the inlet 70 of the cannister 56 and inlet opening 38 of the housing 32, and is less dense than the second area 82. The second area 82 of the filter 56 or filter material is disposed proximal to the outlet 78 of the cannister 57 and outlet opening 40 of the housing 32, and is more dense than the first area 80.

The size of the apertures 50 in the shroud 46, the separator inlet opening 38, and the inlet and outlet 70 and 78 of the filter 56 are critical to the performance of the separator apparatus 28. It is desirable that the inlet opening 38 be as small as possible to reduce exposure to waste material 22 in the tank 18, and to reduce the overall size of the housing 32 to fit in the limited space of the aircraft fuselage. As the size of the opening 38 decreases, the velocity of the gas and suspended moisture increases. At higher flow rates, waste fluid tends to pass through the opening 38 with the gas. Therefore, the opening 38 must be large enough to control velocity such that fluid does not pass through said opening 38. For aircraft waste systems, an opening 38 with a diameter of approximately five inches in conjunction with housing 32 diameter of approximately 7 inches has been found to be effective.

As indicated above, because of the size restraints in the interior of the aircraft where the waste tanks are located, the size of the separator apparatus 28, or housing 32, is critical. Simply utilizing the current internal separator design of the prior art, but moving it from the interior of the tank to the exterior of the tank, is not possible due to space limitations. To locate the separator apparatus 28 in the available space, the size must be reduced. This reduction in size, however, increases the air velocity, which in turn increases the challenge to remove all of the entrained liquid in the air. The increase in velocity is roughly in reverse proportion to the decrease in the cross sectional area of the separator (ignoring gas compression). Because the cross sectional area decreases by the square of the radius, a small decrease in diameter greatly increases the velocity. For example, the velocity of the air going through the external separator, with a diameter of about half of the internal separator is roughly four times that of the internal separator.

Referring to FIG. 2, a ring or annular flange 90 is disposed between the two areas 80 and 82 of the filter 56 and extends inwardly from around a periphery of the filter 56. The annular flange 90 prevents the air from passing around the periphery of the filter 56, or between the filter material and the cannister 57. An annular lip 92 extends downwardly from the inner edge of the flange 90 to redirect the flow of air back through the first stage 80.

To clean or service the separator apparatus 28, the housing 32 is removed from the waste tank 18 and the vacuum source 21 by loosening the clamp 44 and detaching the pipes 20 from the outlet 40. The entire housing 32, with the filter 56 disposed therein, is discarded. The filter 56 is completely disposed within the housing 32, without protruding through the separator inlet opening 38 or into the waste tank 18. Thus, the filter 56 is disposed with the housing 32 without exposure to the filter material 80 and 82, or the waste material 22 in the waste tank 18.

The air and waste material 22 flow through the separator system 10 by entering the waste tank 18. The liquid and solid waste material 22 impacts the bottom of the shroud 46, or shield 51. The large particles of water and particulates fall back down into the tank 18. The air passes around the shield 51 and through the apertures 50 in the shroud 46. The air passes out the gas outlet 24 of the waste tank 18 and into the housing 32 through the separator inlet opening 38. The air enters the first stage 80 of the filter 56. The mesh separates the larger particles out of the air and allows for efficient draining of the separated water. The air that travels up along the surface of the canister 57 reaches the flange 90 and is redirected down into the mesh prior to exiting the first stage 80. The air then enters the second stage 82 of the filter which removes the remaining moisture. The second stage 82 has a greater density than the mesh of the first stage 80 because drainage of moisture is a lesser issue. The air then exits the housing 32 through the separator outlet 40.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. An aircraft separator apparatus configured for use with an aircraft vacuum source and waste tank with a gas outlet, the apparatus comprising:
    a disposable separator housing configured for being disposed directly on the waste tank, and configured for being operatively coupled between the waste tank and the vacuum source, the separator housing having a housing wall defining a hollow interior, a separator inlet opening configured for being coupled to the gas outlet of the tank, and a separator outlet opening configured for being coupled to the vacuum source, the separator inlet and outlet openings defining a gas flow path extending between the separator inlet and outlet openings; and
    a filter completely contained within the interior of the housing and disposed in the gas flow path without extending out of the separator inlet opening and into the waste tank.

2. The separator apparatus of claim 1, wherein the separator inlet opening is approximately 5 inches in diameter, while the separator housing has an outer diameter of approximately less than 7 inches.

3. The separator apparatus of claim 1, further comprising:
    a shroud configured for being disposed in the waste tank at the gas outlet of the tank, the shroud having an annular wall with an upper end disposed at the tank and extending downwardly to a lower end spaced from the gas outlet, the annular wall defining a plurality of apertures through which the gas passes in exiting the tank, the shroud further having a shield attached to the lower end of the annular wall, the shield being disposed in front of the gas outlet to minimize passage of the solids and liquids out of the gas outlet.

4. The separator apparatus of claim 1, wherein the filter is a two-stage filter having at least two areas of different mesh defining two stages including a first area located proximal to the separator inlet opening which is less dense, and a second area located proximal to the separator outlet opening which is more dense.

5. An aircraft separator apparatus configured for use with an aircraft vacuum source and waste tank with a gas outlet, the apparatus comprising:
    a separator housing configured for being operatively coupled between the waste tank and the vacuum source, the separator housing having a housing wall defining a hollow interior, a separator inlet opening configured for being coupled to the gas outlet of the waste tank, and a separator outlet opening configured for being coupled to the vacuum source, the separator inlet and outlet openings defining a gas flow path extending between the separator inlet and outlet openings;
    a filter contained within the interior of the housing and disposed in the gas flow path; and
    a shroud configured for being disposed in the waste tank at the gas outlet of the tank, the shroud having an annular wall with an upper end disposed at the tank and extending downwardly to a lower end spaced from the gas outlet, the annular wall defining a plurality of apertures through which the gas passes in exiting the tank, the shroud further having a shield attached to the lower end of the annular wall, the shield being disposed in front of the gas outlet to prevent passage of the solids and liquids out of the gas outlet.

6. The separator apparatus of claim 5, wherein the shield is concave and has a lower end coupled to the lower end of the annular wall and extending upwardly to an upper end.

7. The separator apparatus of claim 5, wherein the filter is completely contained within the separator housing without extending out the separator inlet opening or into the waste tank.

8. The separator apparatus of claim 5, wherein the separator inlet opening is approximately 5 inches in diameter, while the separator housing has an outer diameter of approximately less than 7 inches.

9. The separator apparatus of claim 5, wherein the filter is a two-stage filter having at least two areas of different density mesh defining two stages including a first area located proximal to the separator inlet opening which is less dense, and a second area located proximal to the separator outlet opening which is more dense.

10. An aircraft separator apparatus configured for use with an aircraft waste tank and vacuum source, the apparatus comprising:
    an enclosed separator housing configured for being operatively coupled between the waste tank and the vacuum source, the separator housing having a housing wall defining a hollow interior, a separator inlet opening configured for being coupled to the gas outlet of the waste tank, and a separator outlet opening configured for being coupled to the vacuum source, the separator inlet and outlet openings defining a gas flow path extending between the separator inlet and outlet openings; and
    a two-stage filter contained within the interior of the housing and disposed in the gas flow path, the filter having at least two areas of different density mesh defining two stages including a first area located proximal to the separator inlet opening which is less dense, and a second area located proximal to the separator outlet opening which is more dense.

11. The separator apparatus of claim 10, further comprising:
    an annular flange disposed between the two areas of different density mesh of the filter and extending around a periphery of the filter.

12. The separator apparatus of claim 10, wherein the filter is completely contained within the separator housing without extending out the separator inlet opening or into the waste tank.

13. The separator apparatus of claim 10, wherein the separator inlet opening is approximately 5 inches in diameter, while the separator housing has an outer diameter of approximately less than 7 inches.

14. The separator apparatus of claim 10, further comprising:

a shroud configured for being disposed in the waste tank at the gas outlet of the tank, the shroud having an annular wall with an upper end disposed at the tank and extending downwardly to a lower end spaced from the gas outlet, the annular wall defining a plurality of apertures through which the gas passes in exiting the tank, the shroud further having a concave shield with a lower end coupled to the lower end of the annular wall and extending upwardly to an upper end, the concave shield being disposed in front of the gas outlet to minimize passage of the solids and liquids out of the gas outlet.

15. An aircraft separator apparatus configured for use with an aircraft waste tank and vacuum source, the apparatus comprising:

a disposable, enclosed separator housing configured for being disposed on the waste tank, and configured for being operatively coupled between the waste tank and the vacuum source, the separator housing having a housing wall defining a hollow interior, a separator inlet opening configured for being removably coupled to a gas outlet of the waste tank, and a separator outlet opening configured for being removably coupled to the vacuum source such that the entire separator housing may be detached from the waste tank and vacuum source and discarded, the separator inlet and outlet openings defining a gas flow path extending between the separator inlet and outlet openings; and a filter contained within the interior of the housing and disposed in the gas flow path; and wherein the separator inlet opening is approximately 5 inches in diameter; and wherein the separator housing has an outer diameter of approximately less than 7 inches.

16. The separator apparatus of claim 15, wherein the filter is completely contained within the separator housing without extending out the separator inlet opening or into the waste tank.

17. The separator apparatus of claim 15, wherein the filter is a two-stage filter having at least two areas of different density mesh defining two stages including a first area located proximal to the separator inlet opening which is less dense, and a second area located proximal to the separator outlet opening which is more dense.

18. The separator apparatus of claim 15, further comprising:

a shroud configured for being disposed in the waste tank at the gas outlet of the tank, the shroud having an annular wall with an upper end disposed at the tank and extending downwardly to a lower end spaced from the gas outlet, the annular wall defining a plurality of apertures through which the gas passes in exiting the tank, the shroud further having a concave shield with a lower end coupled to the lower end of the annular wall and extending upwardly to an upper end, the concave shield being disposed in front of the gas outlet to prevent passage of the solids and liquids out of the gas outlet.

19. An aircraft separator system for removing moisture suspended in a gas of an aircraft waste system, the separator system comprising:

a waste tank for receiving and holding waste material including solids and liquids and in which the moisture suspended in the gas is initially located, the waste tank having a waste inlet opening through which the waste material enters the tank and a gas outlet through which the gas with the moisture suspended therein exits the tank;

a vacuum source operatively coupled to and in fluid communication with the waste tank for creating a vacuum for drawing the waste material into the tank and drawing the gas with the moisture suspended therein out of the tank;

a disposable separator housing disposed on the tank and operatively coupled between the waste tank and the vacuum source, the separator housing having a housing wall defining a hollow interior, a separator inlet opening removably coupled to the gas outlet of the tank, and a separator outlet opening removably coupled to the vacuum source such that the entire separator housing may be detached from the waste tank and vacuum source and discarded, the separator inlet and outlet openings defining a gas flow path extending between the separator inlet and outlet openings, the separator inlet opening being approximately 5 inches in diameter;

a two-stage filter contained within the interior of the housing and disposed in the gas flow path, the filter having at least two areas of different density mesh defining two stages including a first area located proximal to the separator inlet opening which is less dense, and a second area located proximal to the separator outlet opening which is more dense; and a shroud disposed in the waste tank at the gas outlet of the tank, the shroud having an annular wall with an upper end disposed at the tank and extending downwardly to a lower end spaced from the gas outlet, the annular wall defining a plurality of apertures through which the gas passes in exiting the tank, the shroud further having a concave shield with a lower end coupled to the lower end of the annular wall and extending upwardly to an upper end, the concave shield being disposed in front of the gas outlet to minimize passage of the solids and liquids out of the gas outlet.

20. The separator system of claim 19, wherein the filter prevents the formation of moisture droplets past the separator outlet opening with the vacuum source operating continually for at least 60 minutes.

21. The separator system of claim 19, further comprising:
an annular flange disposed between the two areas of different density mesh of the filter and extending inwardly from around a periphery of the filter.

22. The separator system of claim 19, wherein the separator housing and the separator inlet and outlet openings define a direct, substantially linear gas travel path extending between the separator inlet and outlet openings substantially unimpeded by any structure other than the filter.

* * * * *